(12) United States Patent
Saito et al.

(10) Patent No.: US 8,528,436 B2
(45) Date of Patent: Sep. 10, 2013

(54) MOTOR-DRIVEN STEERING ASSIST APPARATUS

(76) Inventors: Mitsuo Saito, Tochigi (JP); Koichi Hata, Tochigi (JP)

(*) Notice: Subject to any disclaimer, the term of this patent is extended or adjusted under 35 U.S.C. 154(b) by 195 days.

(21) Appl. No.: 13/050,643

(22) Filed: Mar. 17, 2011

(65) Prior Publication Data

US 2012/0061170 A1    Mar. 15, 2012

Related U.S. Application Data (62) Division of application No. 11/222,106, filed on Sep. 8, 2005, now Pat. No. 7,930,950.

(30) Foreign Application Priority Data

Jan. 25, 2005  (JP) .................................. 2005-017502
Jan. 27, 2005  (JP) .................................. 2005-020403

(51) Int. Cl.
*F16H 35/00*  (2006.01)
*F16H 57/02*  (2012.01)
*F16H 57/04*  (2010.01)
*F16H 61/00*  (2006.01)

(52) U.S. Cl.
USPC ...................................... 74/388 PS; 74/606 R (58) Field of Classification Search
USPC ................................... 74/388 PS, 425, 606 R
See application file for complete search history.

(56) References Cited

U.S. PATENT DOCUMENTS

| | | | |
|---|---|---|---|
| 6,044,723 A * | 4/2000 | Eda et al. .................. | 74/388 PS |
| 6,550,567 B2 * | 4/2003 | Murakami et al. ............ | 180/444 |
| 6,644,431 B2 * | 11/2003 | Kuze et al. .................... | 180/444 |
| 7,201,075 B2 * | 4/2007 | Tsutsui et al. ............ | 74/388 PS |
| 7,213,677 B2 * | 5/2007 | Nakamura et al. ............ | 180/444 |
| 7,240,762 B2 * | 7/2007 | Shiina et al. .................. | 180/444 |
| 7,591,341 B2 * | 9/2009 | Shimamoto et al. .......... | 180/444 |
| 2006/0272438 A1 * | 12/2006 | Kurokawa ................. | 74/388 PS |

* cited by examiner

*Primary Examiner* — Troy Chambers
*Assistant Examiner* — Michael Gonzalez

(57) ABSTRACT

In a motor-driven steering assist apparatus, a gear train transmitting a rotation of an electric motor to an output shaft comprises a single unit body surrounded by housings, and an attaching boss to a vehicle body side bracket is provided in a lower surface of the housing as seen from an axial direction of the output shaft.

14 Claims, 10 Drawing Sheets

MOTOR-DRIVEN STEERING ASSIST APPARATUS

CROSS-REFERENCES TO RELATED APPLICATIONS

This new application is a divisional application of application Ser. No. 11/222,106 filed on 8 Sep. 2005 with the US Patent and Trademark Office. The original case (Ser. No. 11/222,106) claimed priority of Application number 2005-017502 filed on 25 Jan. 2005 and Application number 2005-020403 filed on 27 Jan. 2005 filed with the Japanese Patent and Trademark Office.

BACKGROUND OF THE INVENTION

1. Field of the Invention

The present invention relates to a motor-driven steering assist apparatus.

2. Description of the Related Art

In a motor-driven steering assist apparatus of a rough road traveling vehicle, such as a buggy vehicle or the like, as described in Japanese Patent Application Laid-open No. 2004-336565 (patent document 1), there is a structure which is interposed between a steering wheel and a tire wheel side steering member, which assists steering force applied to the steering wheel by a driver on the basis of torque generated by an electric motor.

In the motor-driven steering assist apparatus in the patent document 1, a single unit body covered by first to third housings has an input shaft to which a steering wheel is connected and an output shaft to which a wheel side steering member is connected. A torque sensor is provided between the input shaft and the output shaft. An electric motor is driven in correspondence to a detected torque of the torque sensor. A worm gear is coupled to a rotary shaft of the electric motor, and a worm wheel is coupled to the output shaft and is engaged with the worm gear built-in. Further, an upper end portion of the input shaft and the torque sensor are supported to the first housing. An upper end portion of the output shaft, the electric motor, the worm gear and the worm wheel are supported to the second housing. A lower end portion of the output shaft is supported to the third housing, and the second housing can be attached to a vehicle body frame (a vehicle body side bracket).

In the motor-driven steering assist apparatus in the patent document 1, an attaching boss is provided at a plurality of positions in a peripheral direction of an outer periphery of the second housing, and an attaching bolt inserted and attached to the attaching boss is fastened to a vehicle body side attaching bracket. The second housing receives the worm gear and the worm wheel and forms a large outer diameter itself. The attaching boss provided in the outer periphery of the second housing protrudes more to an outer side, the vehicle body side bracket is enlarged in size, and it is hard to avoid an interference with peripheral equipment such as an engine or the like. Further, the second housing receives the worm gear and forms a different outer shape, and complicated consideration is necessary for arranging the attaching boss while avoiding the worm gear receiving portion.

Further, in the motor-driven steering assist apparatus in the patent document 1, it is necessary that the attaching boss is provided at a plurality of positions, for example, three positions in the peripheral direction of the outer periphery of the second housing. Three attaching bolts inserted and attached to the attaching boss are fastened, so that it is necessary to carry out a complicated procedure.

SUMMARY OF THE INVENTION

An object of the present invention is to improve an attaching property to a vehicle body and to achieve a compact size and weight saving, in a motor-driven steering assist apparatus.

The present invention relates to a motor-driven steering assist apparatus interposed between a steering wheel and a wheel side steering member, for assisting steering force which a driver applies to the steering wheel, on the basis of a generating torque of an electric motor. A single unit body covered by a housing has an input shaft to which the steering wheel is connected, an output shaft to which the wheel side steering member is connected, and a torque sensor which is provided between the input shaft and the output shaft. An electric motor is driven in correspondence to a detected torque of the torque sensor, and a gear train transmits rotation of the electric motor to the output shaft built-in. An attaching portion to a vehicle body side bracket is provided in a lower surface of a housing as seen from an axial direction of the output shaft.

The present invention relates to a motor-driven steering assist apparatus interposed between a steering wheel and a wheel side steering member, for assisting a steering force which a driver applies to the steering wheel, on the basis of a generating torque of an electric motor. A single unit body covered by a housing has an input shaft to which the steering wheel is connected, and an output shaft to which the wheel side steering member is connected. A torque sensor is provided between the input shaft and the output shaft. An electric motor is driven in correspondence to a detected torque of the torque sensor, and a gear train transmits rotation of the electric motor to the output shaft built-in. An annular attaching portion surrounding the output shaft is provided in a protruding manner in an attaching seat formed in the lower surface of the housing as seen from an axial direction of the output shaft. The annular attaching portion of the housing is inserted to an attaching hole provided in a vehicle body side attaching stay. The attaching seat of the housing is seated on a peripheral portion of the attaching hole of the vehicle body side attaching stay, and the vehicle body side attaching stay is pinched between a nut screwed from a leading end side of the annular attaching portion of the housing and the attaching seat.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 1A and 1B show a motor-driven steering assist apparatus in accordance with an embodiment 1, in which

DESCRIPTION OF THE PREFERRED EMBODIMENTS

Embodiment 1

Figures 1A, 1B:
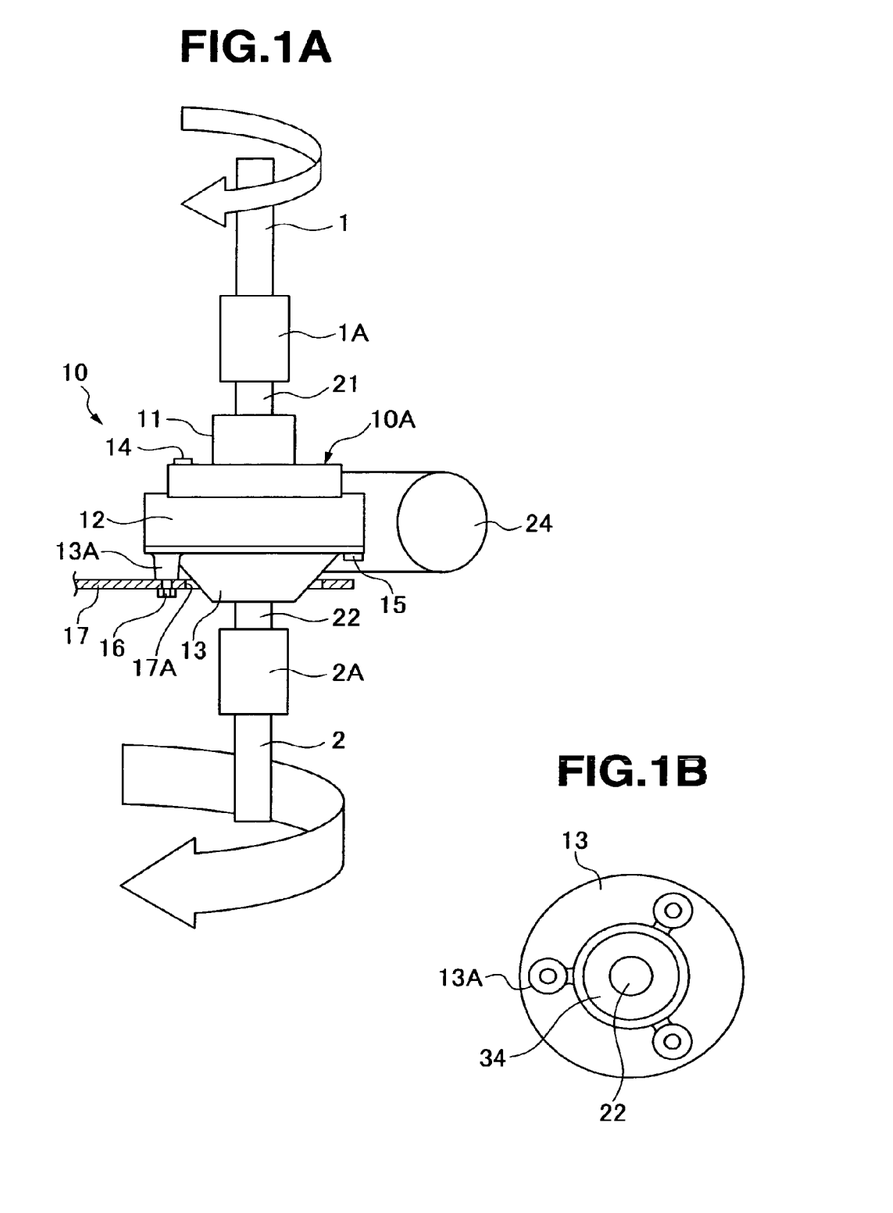
FIG. 1A is a schematic view of an entire structure.
FIG. 1B is a bottom elevational view of a housing.
Figure 2:
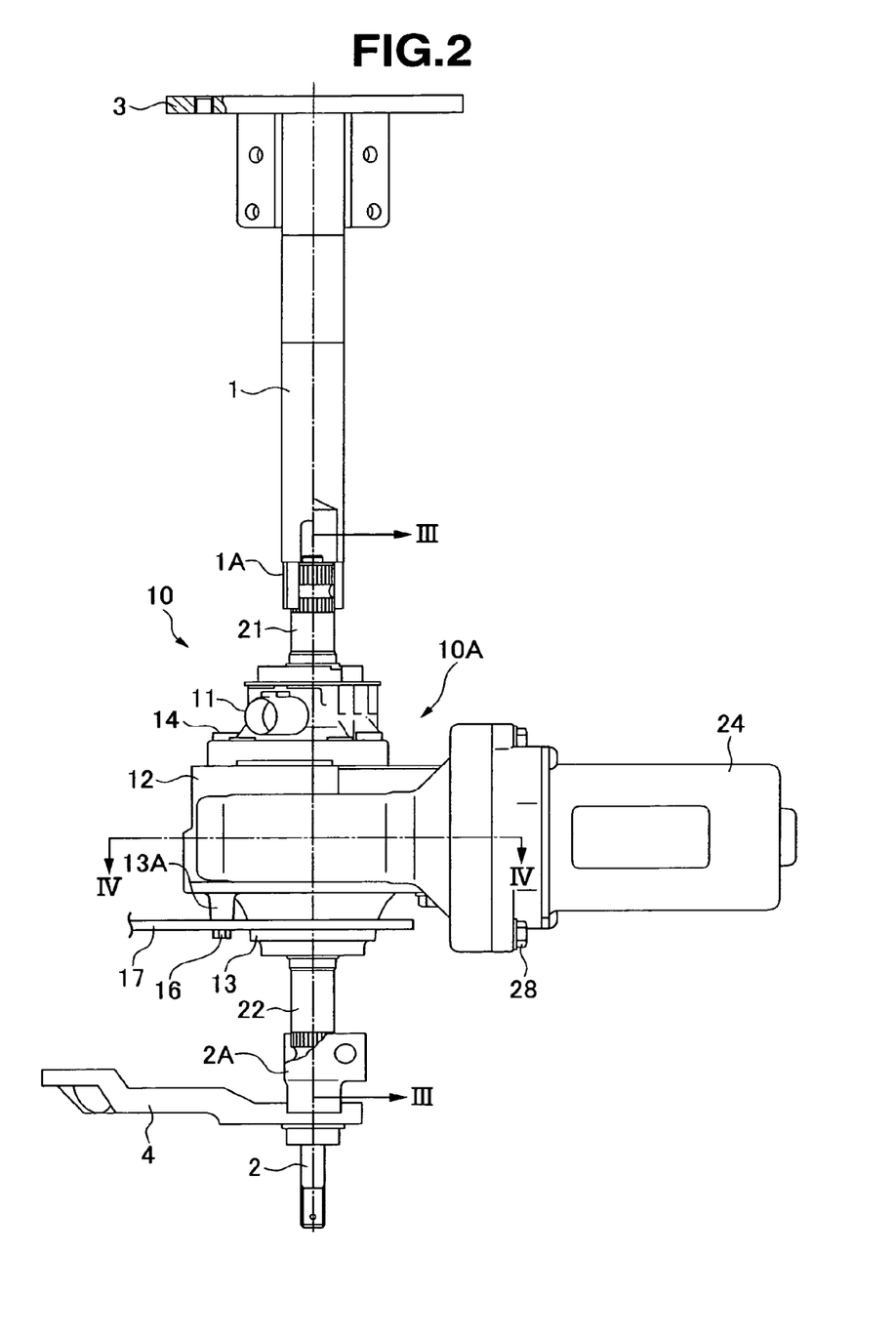
FIG. 2 is a front elevational view showing the motor-driven steering assist apparatus in accordance with the embodiment 1.

A motor-driven steering assist apparatus 10 may be applied to a rough road traveling vehicle, for example, a buggy vehicle, a snowmobile and the like. The apparatus is interposed between a steering wheel side steering member 1 and a tire wheel side steering member 2, as shown in FIGS. 1 and 2, and assists steering force applied to the steering wheel by a driver, on the basis of a generated torque of an electric motor 24. A steering wheel attaching member 3 is fixed to the steering wheel side steering member 1, and a pitman arm 4 is fixed to the wheel side steering member 2. The pitman arm 4 is coupled to a front wheel via right and left tie rods.

The motor-driven steering assist apparatus 10 comprises a single unit body 10A covered by first housing 11 (upper housing or upper cover), second housing (main housing), and third housing (lower housing or lower cover) 13, as shown in FIGS. 1 to 4. The unit body 10A has an input shaft 21, an output shaft 22, a torque sensor 23, an electric motor 24, a worm gear 25 and a worm wheel 26 built-in.

Figure 3:
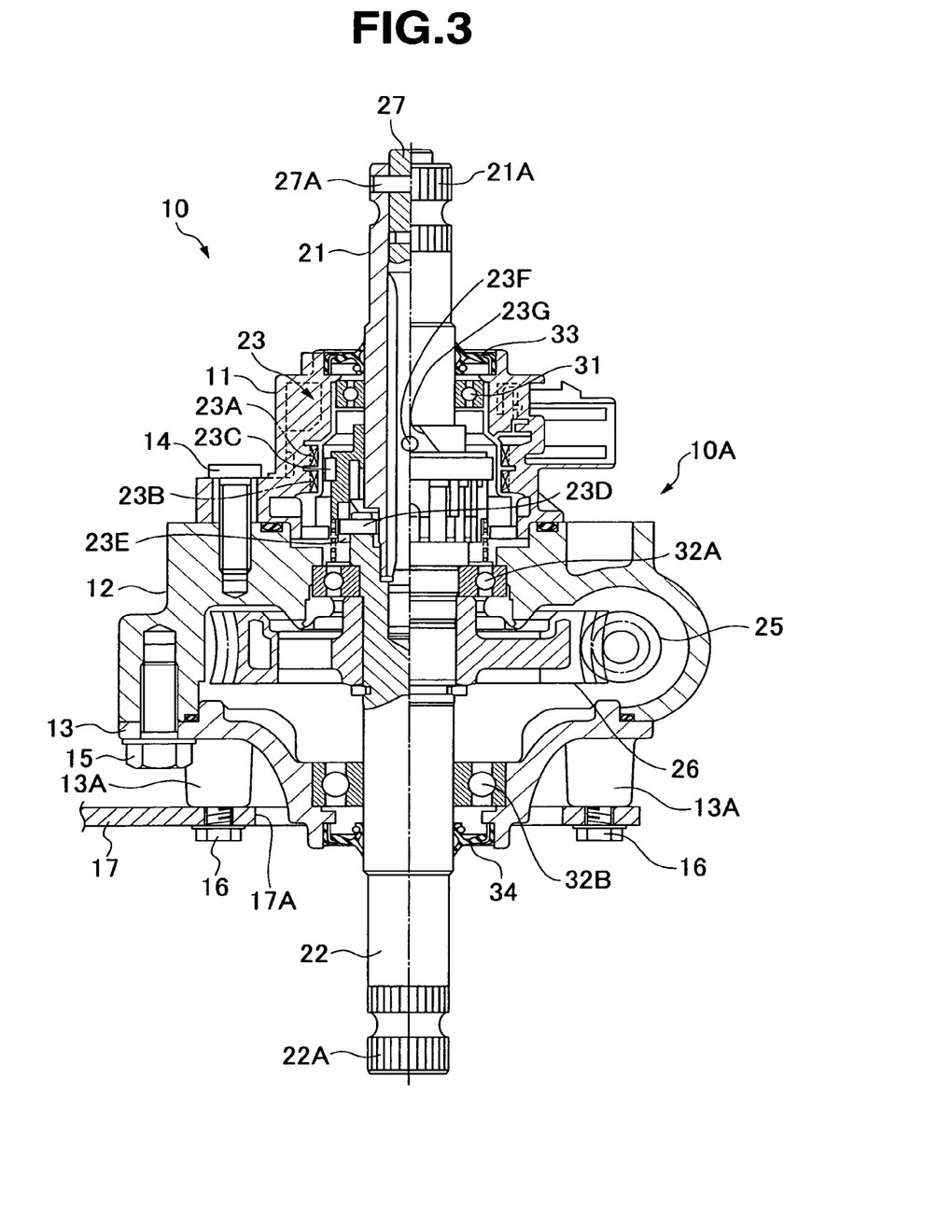
FIG. 3 is a cross sectional view along a line III-III in FIG. 2.

The motor-driven steering assist apparatus 10 comprises an upper end portion of the input shaft 21 to which the steering wheel side steering member 1 is connected by a connecting device 1A is supported to the first housing 11 (FIG. 3) by the bearing 31. Upper and lower end portions of the output shaft 22 to which the tire wheel side steering member 2 is connected by a connecting device 2A are supported to the second housing 12 and the third housing 13 by upper and lower bearings 32A and 32B (FIG. 3). The input shaft 21 is provided with a serration 21A for connected to the connecting device 1A in an upper end outer peripheral portion. The output shaft 22 is provided with a serration 22A for connecting to the connecting device 2A in a lower end outer peripheral portion. A torsion bar 27 is inserted in a hollow portion of the input shaft 21. One end of the torsion bar 27 is coupled to the input shaft 21 by a coupling pin 27A, and the other end of the torsion bar 27 is inserted in a hollow portion of the output shaft 22 so as to be connected by serration.

A torque sensor 23 is provided with two detecting coils 23A and 23B surrounding a cylindrical core 23C engaged with the input shaft 21 and the output shaft 22, in the first housing 11, as shown in FIG. 3. The core 23C is provided with a vertical groove 23E engaging with a guide pin 23D of the output shaft 22 so as to be movable only in an axial direction, and is provided with a spiral groove 23G engaging with a slider pin 23F of the input shaft 21. Accordingly, when steering torque applied to the steering wheel is applied to the input shaft 21, and a relative displacement in a rotation direction is generated between the input shaft 21 and the output shaft 22 on the basis of an elastic torsional deformation of the torsion bar 27, the displacement in the rotation direction of the input shaft 21 and the output shaft 22 displaces the core 23C in an axial direction. An inductance of the detecting coils 23A and 23B caused by a magnetic change around the detecting coils 23A and 23B due to the displacement of the core 23C is changed. In other words, when the core 23C moves close to the input shaft 21, the inductance of the detecting coil 23A to which the core 23C moves close is increased, and the inductance of the detecting coil 23B from which the core 23C moves apart is reduced, whereby it is possible to detect the steering torque on the basis of the change of the inductance.

Figure 4:
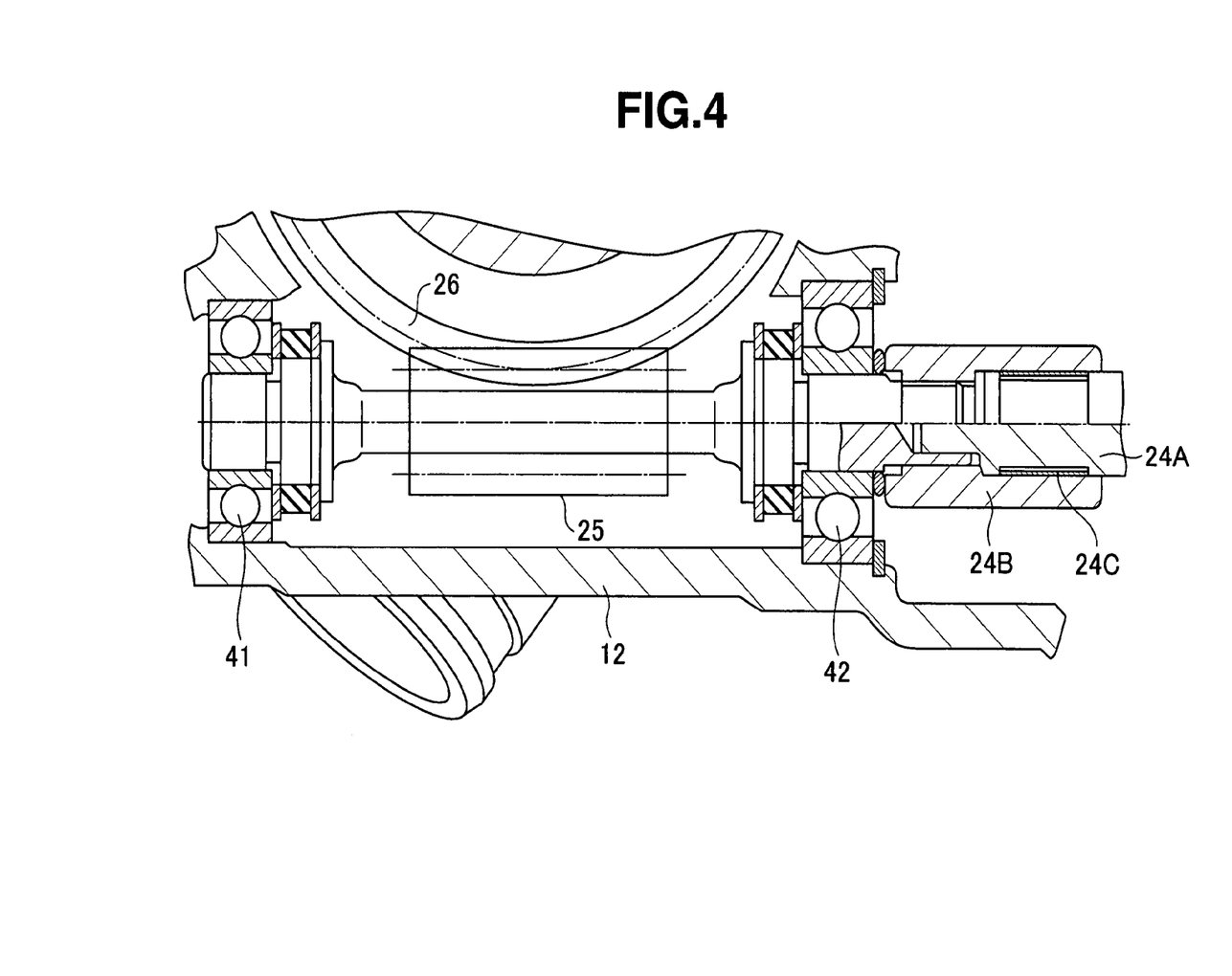
FIG. 4 is a cross sectional view along a line IV-IV in FIG. 2.

The electric motor 24 is attached and supported to the second housing 12 by a mounting bolt 28, and is driven by a controller (not shown) in correspondence to the detected torque of the torque sensor 23. A worm gear 25 is coupled to a rotation shaft 24A of the electric motor 24 by a joint 24B, and the worm wheel 26 engaging with the worm gear 25 is fixed to the output shaft 22. The worm gear 25 is supported at both ends to the second housing 12 by right and left bearings 41 and 42, as shown in FIG. 4. The worm wheel 26 is fixed to the output shaft 22 just below an upper bearing 32A in the output shaft 22, in an inner portion of the second housing 12.

In this case, the joint 24B coupling the rotation shaft 24A of the electric motor 24 and the worm gear 25 is structured such that a torque limiter 24C constituted by an elastic ring is interposed in a fitting gap between both the elements (FIG. 4). The torque limiter 24C keeps coupling the rotation shaft 24A and the joint 24B under normal using torque conditions of the motor-driven steering assist apparatus 10, allows them to slip under abnormal torque conditions, and does not transmit the torque of the electric motor 24 to a side of the joint 24B.

Accordingly, in the motor-driven steering assist apparatus, an integral unit body 10A is structured by supporting the upper end portion of the input shaft 21 and the torque sensor 23 to the first housing 11. The upper end portion of the output shaft 22, the electric motor 24, the worm gear 25 and the worm wheel 26 are supported by the second housing 12. The lower end portion of the output shaft 22 is supported by the third housing 13. The first housing 11 and the second housing 12 are coupled by the mounting bolt 14, and the second housing 12 and the third housing 13 are coupled by the mounting bolt (FIG. 3). An oil seal 33 is attached in a sealing manner to an upper opening portion of the bearing 31 in the first housing 11, and an oil seal 34 is attached in a sealing manner to a lower opening portion of the bearing 32B in the third housing 13 (FIG. 3).

Further, the motor-driven steering assist apparatus 10 is provided with an attaching boss 13A to the vehicle body side bracket 17 in a lower surface of the third housing 13 as seen from an axial direction of the output shaft 22. The attaching boss 13A is provided at a plurality of positions, three positions in the present embodiment, refer to FIG. 1B, in a peripheral direction in the periphery of the bearing 32B receiving portion for the output shaft 22, in the lower surface of the third housing 13. The attaching boss 13A provided in the lower surface of the third housing 13 is received within a profile of the second housing 12 as seen from the axial direction of the output shaft 22.

In the motor-driven steering assist apparatus 10, an end surface of the attaching boss 13A of the third housing 13 of the unit body 10A is mounted on the vehicle body side bracket 17, and a center portion such as the oil seal 34 receiving portion of the third housing 13 or the like, and the output shaft 22 are arranged in the center hole 17A of the vehicle body side bracket 17, the attaching bolt 16 inserted and attached to the vehicle body side bracket 17 from a lower side is screwed into a thread hole of the attaching boss 13A. The third housing 13 is fastened to the vehicle body side bracket 17.

In accordance with the motor-driven steering assist apparatus 10, the steering torque applied to the steering wheel is detected by the torque sensor 23, the electric motor 24 is driven on the basis of the detected torque, and the torque generated by the electric motor 24 is transmitted to the output shaft 22 via the worm gear 25 and the worm wheel 26. Accordingly, the torque generated by the electric motor 24 is used as an assist force for the steering force applied to the steering wheel by the driver.

In accordance with the present embodiment, the following operations and effects can be achieved.

(a) Since the attaching boss 13A is provided in the lower surface of the third housing 13, the attaching boss 13A is downsized without protruding to the outer side in comparison with the structure that the attaching boss 13A is provided in the outer peripheries of the first to third housings 11 to 13. The vehicle body side bracket 17 is not enlarged in size, and it is possible to inhibit interference with the peripheral equipment such as the engine or the like.

(b) Since the attaching boss 13A is provided in the lower surface of the third housing 13 even if the outer shape of the second housing 12 is formed in the different shape in the receiving portion of the worm gear 25, it is possible to freely arrange the position of the attaching boss 13A.

(c) Although the second housing 12 receives the worm gear 25 and the worm wheel 26 and forms the large outer diameter in itself, the attaching boss 13A is provided in the lower surface of the third housing 13 so as to be received within the profile of the second housing 12, and can be downsized.

In the present invention, the gear train transmitting the rotation of the electric motor to the output shaft is not limited to the structure constituted by the worm gear and the worm wheel.

Further, in the present invention, a vibration absorbing elastic material may be interposed between the vehicle body side bracket and the attaching portion provided in the lower surface of the housing.

As mentioned above, in accordance with the present invention, since the attaching portion is provided in the lower surface of the housing, the attaching portion is downsized without protruding to the outer side in comparison with the structure in which the attaching portion is provided in the outer periphery of the housing. The vehicle body side bracket is not enlarged in size, and it is possible to inhibit interference with the peripheral equipment such as the engine or the like.

Further, in accordance with the present invention, since the attaching portion is not provided in the outer periphery of the housing but the attaching portion is provided in the lower surface of the housing even if the outer shape of the housing forms the different shape, it is possible to freely arrange the position of the attaching portion.

Embodiment 2

Figure 5:
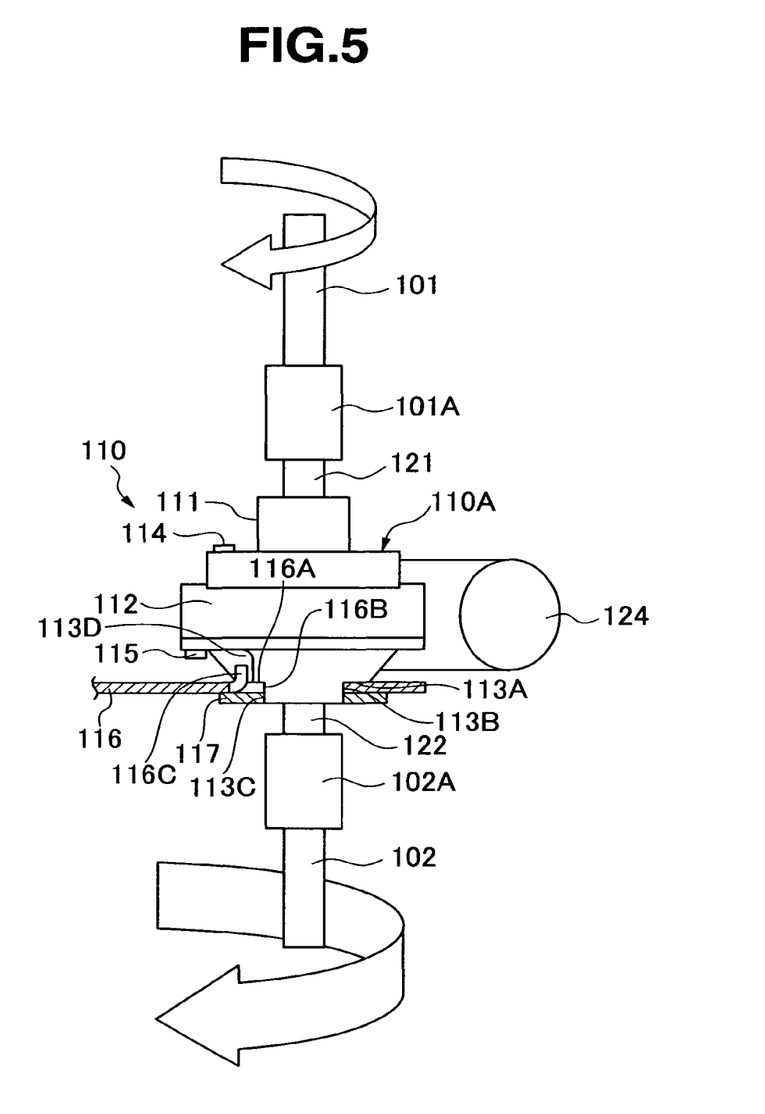
FIG. 5 is an entire schematic view showing a motor-driven steering assist apparatus in accordance with an embodiment 2.
Figure 6:
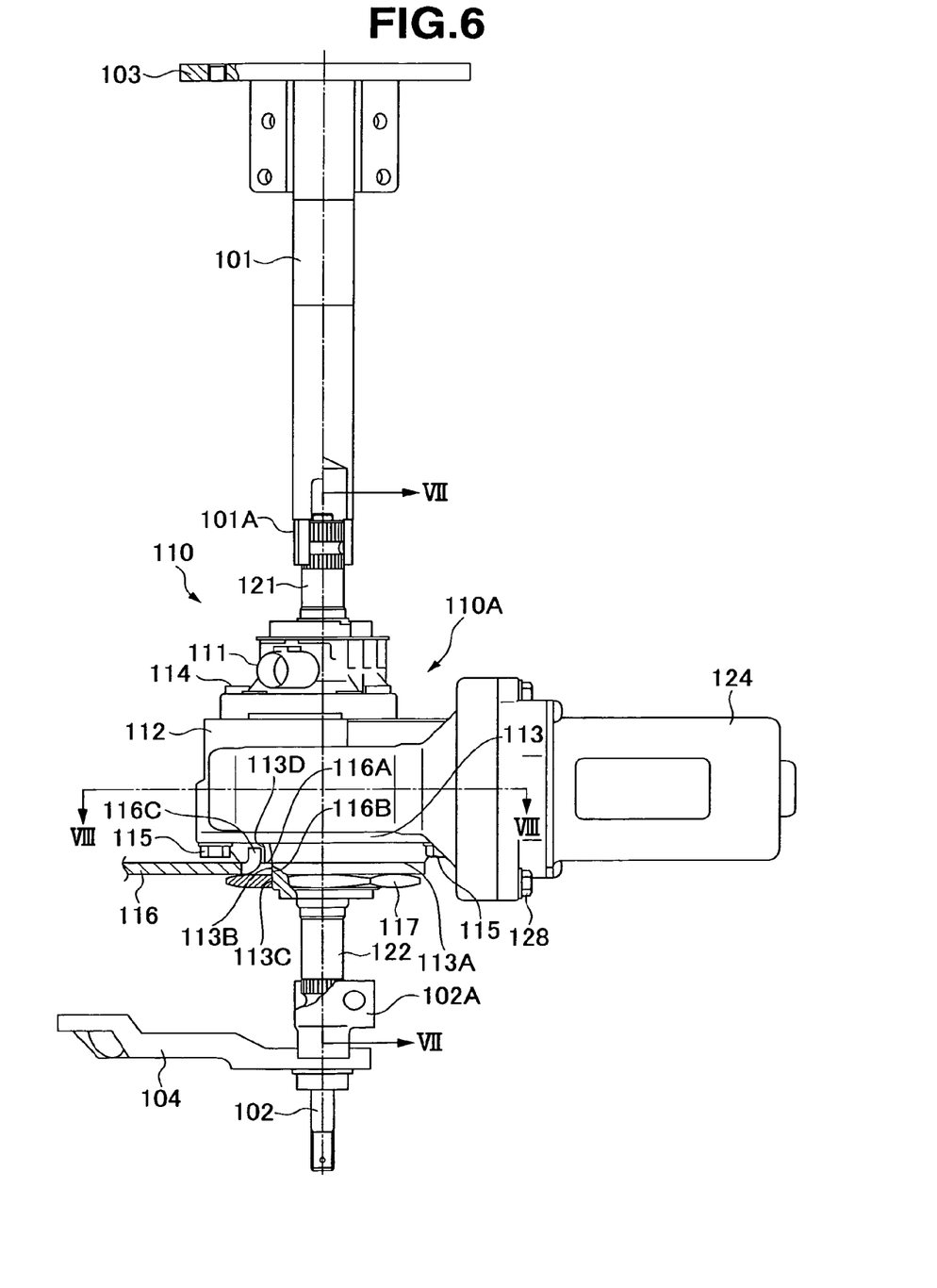
FIG. 6 is a front elevational view showing the motor-driven steering assist apparatus in accordance with the embodiment 2.

A motor-driven steering assist apparatus 110 may be applied to a rough road traveling vehicle, for example, a buggy vehicle, a snowmobile and the like. The apparatus is interposed between a steering wheel side steering member 101 and a tire wheel side steering member 102, as shown in FIGS. 5 and 6, and assists steering force applied to the steering wheel by a driver, on the basis of generated torque of an electric motor 124. A steering wheel attaching member 103 is fixed to the steering wheel side steering member 101, and a pitman arm 104 is fixed to the wheel side steering member 102. The pitman arm 104 is coupled to a front wheel via right and left tie rods.

The motor-driven steering assist apparatus 110 has a single unit body 110A covered by first housing 111 (upper housing or upper cover), second housing (main housing), and third housing (lower housing or lower cover) 113, as shown in FIGS. 5 to 8. The unit body 110A has an input shaft 121, an output shaft 122, a torque sensor 123, an electric motor 124, a worm gear 125 and a worm wheel 126 built-in.

Figure 7:
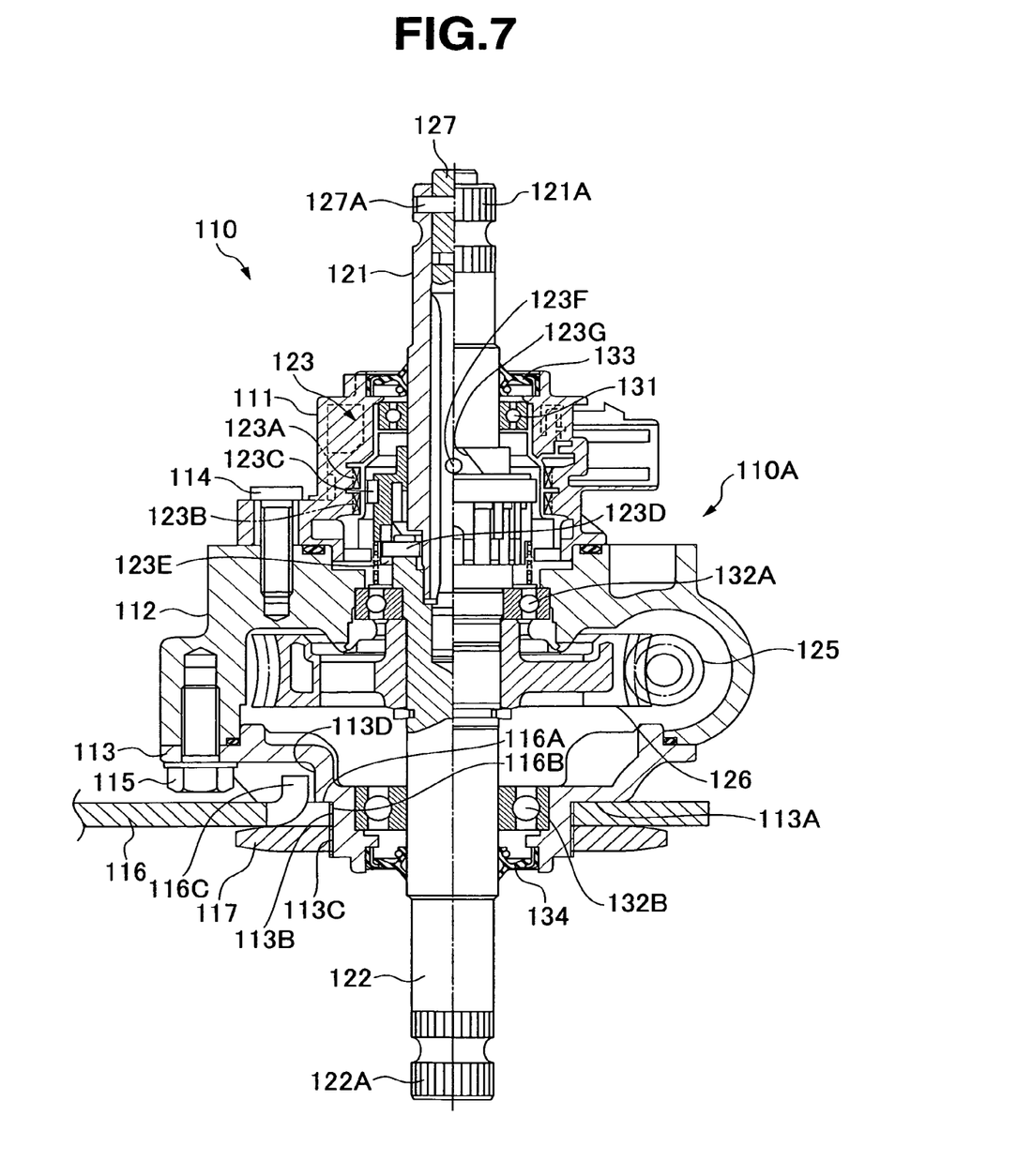
FIG. 7 is a cross sectional view along a line VII-VII in FIG. 6.

The motor-driven steering assist apparatus 110 is structured such that an upper end portion of the input shaft 121 to which the steering wheel side steering member 101 is connected by a connecting device 101A is supported to the first housing 111 (FIG. 7) by the bearing 131. Upper and lower end portions of the output shaft 122 to which the tire wheel side steering member 102 is connected by a connecting device 102A are supported to the second housing 112 and the third housing 113 by upper and lower bearings 132A and 132B (FIG. 7). The input shaft 121 is provided with a serration 121A for connection to the connecting device 101A in an upper end outer peripheral portion. The output shaft 122 is provided with a serration 122A for connecting to the connecting device 102A in a lower end outer peripheral portion. A torsion bar 127 is inserted in a hollow portion of the input shaft 121. One end of the torsion bar 127 is coupled to the input shaft 121 by a coupling pin 127A, and the other end of the torsion bar 127 is inserted in a hollow portion of the output shaft 122 so as to be connected by serration.

A torque sensor 123 is provided with two detecting coils 123A and 123B surrounding a cylindrical core 123C engaged with the input shaft 121 and the output shaft 122, in the first housing 111, as shown in FIG. 7. The core 123C is provided with a vertical groove 123E engaging with a guide pin 123D of the output shaft 122 so as to be movable only in an axial direction, and is provided with a spiral groove 123G engaging with a slider pin 123F of the input shaft 121. Accordingly, when steering torque applied to the steering wheel is applied to the input shaft 121, and relative displacement in a rotation direction is generated between the input shaft 121 and the output shaft 122 on the basis of an elastic torsional deformation of the torsion bar 127, the displacement in the rotation direction of the input shaft 121 and the output shaft 122 displaces the core 123C in an axial direction. An inductance of the detecting coils 123A and 123B caused by a magnetic change around the detecting coils 123A and 123B due to the displacement of the core 123C is changed. In other words, when the core 123C moves close to the input shaft 121, the inductance of the detecting coil 123A to which the core 123C moves close is increased, and the inductance of the detecting coil 123B from which the core 123C moves apart is reduced, whereby it is possible to detect the steering torque on the basis of the change of the inductance.

Figure 8:
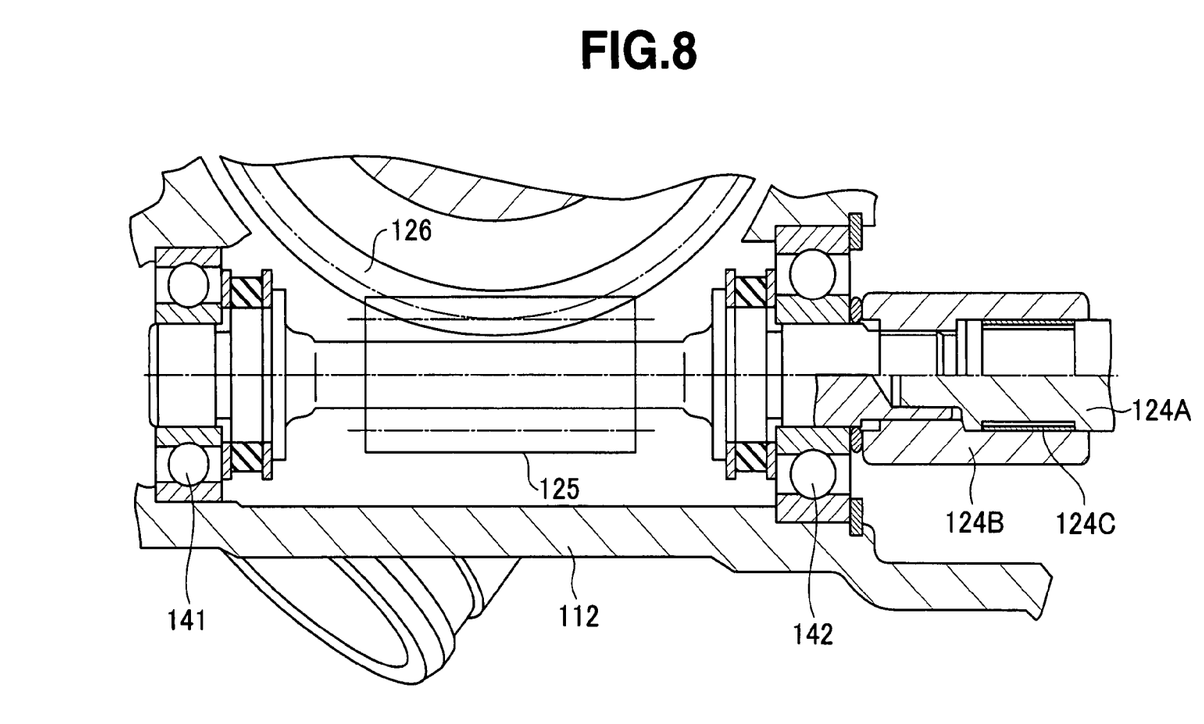
FIG. 8 is a cross sectional view along a line VIII-VIII in FIG. 6.

The electric motor 124 is attached and supported to the second housing 112 by a mounting bolt 128, and is driven by a controller (not shown) in correspondence to the detected torque of the torque sensor 123. A worm gear 125 is coupled to a rotation shaft 124A of the electric motor 124 by a joint 124B, and the worm wheel 126 engaging with the worm gear 125 is fixed to the output shaft 122. The worm gear 125 is supported at both ends to the second housing 112 by right and left bearings 141 and 142, as shown in FIG. 8. The worm wheel 126 is fixed to the output shaft 122 just below an upper bearing 132A in the output shaft 122, in an inner portion of the second housing 112.

In this case, the joint 124B coupling the rotation shaft 124A of the electric motor 124 and the worm gear 125 is structured such that a torque limiter 124C constituted by an elastic ring is interposed in a fitting gap between both the elements (FIG. 8). The torque limiter 124C keeps coupling the rotation shaft 124A and the joint 124B under normal torque conditions of the motor-driven steering assist apparatus 110, allows them to slip under abnormal torque conditions, and does not transmit the torque of the electric motor 124 to a side of the joint 124B.

Accordingly, in the motor-driven steering assist apparatus, an integral unit body 110A is structured by supporting the upper end portion of the input shaft 121 and the torque sensor 123 to the first housing 111. The upper end portion of the output shaft 122, the electric motor 124, the worm gear 125 and the worm wheel 126 are supported by the second housing 112. The lower end portion of the output shaft 122 is supported by the third housing 113. The first housing 111 and the second housing 112 are coupled by the mounting bolt 114, and the second housing 112 and the third housing 113 are coupled by the mounting bolt 115 (FIG. 7). An oil seal 133 is attached in a sealing manner to an upper opening portion of the bearing 131 in the first housing 11, and an oil seal 134 is attached in a sealing manner to a lower opening portion of the bearing 132B in the third housing 113 (FIG. 7).

Figure 10:
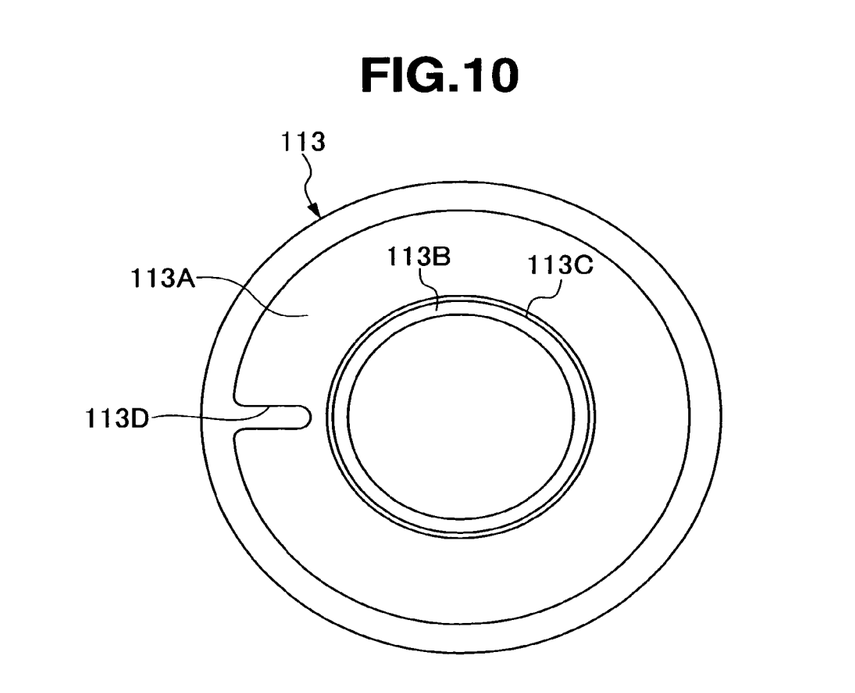
FIG. 10 is a bottom elevational view showing a third housing in accordance with the embodiment 2.

The motor-driven steering assist apparatus 110 is structured, as shown in FIGS. 5 to 7, such that a flat-shaped attaching seat 113A is formed in the lower surface of the third housing 113 as seen from an axial direction of the output shaft 122. A circular ring-shaped attaching portion 113B surrounding the output shaft 122 is provided in a protruding manner in the attaching seat 113A, and a thread portion 113C is provided from a leading end side of the outer periphery of the attaching seat 113A (FIG. 10). Further, the annular attaching portion 113B of the third housing 113 is inserted to the circular attaching hole 116B provided in the vehicle body side attaching stay 116. The attaching seat 113A of the third housing 113 is seated on the peripheral portion 116A of the attaching hole 116B of the vehicle body side attaching stay 116. The nut 117 is screwed with the thread portion 113C in the leading end side of the annular attaching portion 113B of the third housing 113 protruding from the attaching hole 116B, the vehicle body side attaching stay 116 is pinched between the nut 117 and the attaching seat 113A, and the third housing 113 is fastened to the vehicle body side attaching stay 116.

The attaching seat 113A and the annular attaching portion 113B provided in the lower surface of the third housing 113 are received within the profile of the second housing 112 as seen from the axial direction of the output shaft 122.

Figure 9:
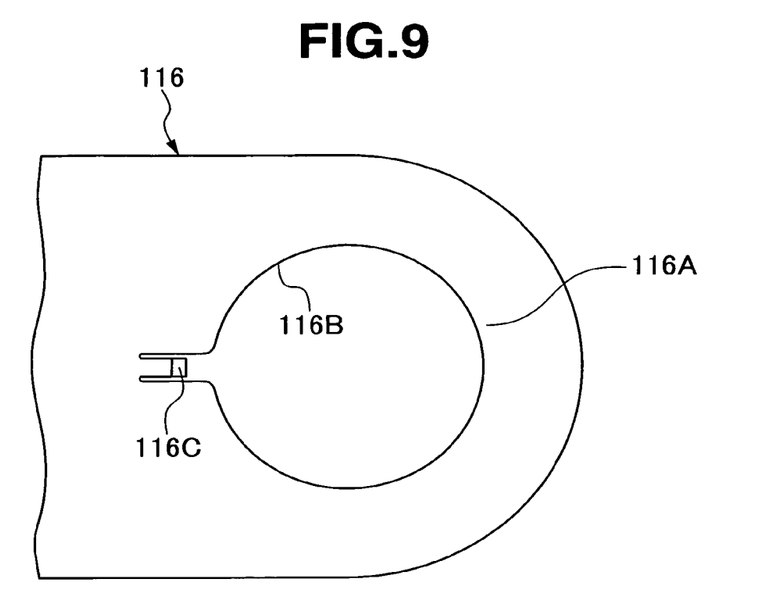
FIG. 9 is a plan view showing a vehicle body side attaching stay in accordance with the embodiment 2.

Further, the motor-driven steering assist apparatus 110 is provided with a locking portion 116C obtained by cutting up a part of the peripheral portion 116A of the attaching hole 116B in the vehicle body side attaching stay 116 (FIG. 9), and is provided with a concave locked portion 113D in a part along the peripheral direction of the annular attaching portion 113B in the attaching seat 113A of the third housing 113. Further, where the attaching seat 113A of the third housing 113 is seated on the peripheral portion 116A of the attaching hole 116B of the vehicle body side attaching stay 116, the locking portion 116C and the locked portion 113D are engaged, and the third housing 113 is prevented from rotating with respect to the vehicle body side attaching stay 116.

In accordance with the motor-driven steering assist apparatus 110, the steering torque applied to the steering wheel is detected by the torque sensor 123, the electric motor 124 is driven by the detected torque, and the torque generated by the electric motor 124 is transmitted to the output shaft 122 via the worm gear 125 and the worm wheel 126. Accordingly, the torque generated by the electric motor 124 can be used as the assist force for the steering force applied to the steering wheel by the driver.

In accordance with the present embodiment, the following operations and effects can be achieved.

(a) Since the attaching seat 113A and the annular attaching portion 113B are provided in the lower surface of the third housing 113, the attaching seat 113A and the annular attaching portion 113B are downsized without protruding to the outer side in comparison with the structure that the attaching seat 113A and the annular attaching portion 113B are provided in the outer peripheries of the first to third housings 111 to 113. The vehicle body side attaching stay 116 is not enlarged in size, and it is possible to inhibit the interference with the peripheral equipment such as the engine or the like.

(b) Since the attaching seat 113A and the annular attaching portion 113B are provided in the lower surface of the third housing 113 even if the outer shape of the second housing 112 is formed in the different shape in the receiving portion of the worm gear 125, it is 110 possible to simply form the attaching seat 113A and the annular attaching portion 113B.

(c) The third housing 113 is attached to the vehicle body side attaching stay 116 in accordance with the nut fastening of the single nut 117, and it is possible to save labor expenditures.

(d) It is possible to attach the third housing 113 to the vehicle body side attaching stay 116 while simply preventing the third housing 113 from rotating, by engaging the locked portion 113D provided in the third housing 113 with the locking portion 116C of the vehicle body side attaching stay 116.

(e) Although the second housing 112 receives the worm gear 125 and the worm wheel 126 and forms the large outer diameter in itself, the attaching seat 113A and the annular attaching portion 113B are provided in the lower surface of the third housing 113 so as to be received within the profile of the second housing 112, and can be downsized.

Figure 11:
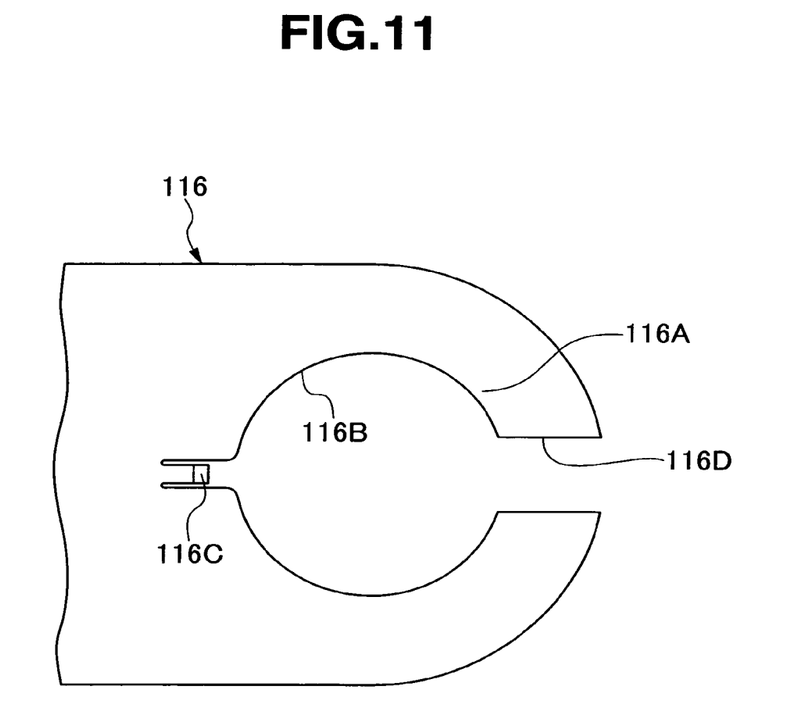
FIG. 11 is a plan view showing a variant of the vehicle body side attaching stay in accordance with the embodiment 2.

FIG. 11 shows a variant of the vehicle body side attaching stay 116, in which the attaching hole 116B is structured by notching a groove-shaped opening portion 116D open to the outer side. An opening width of the opening portion 116D is larger than an outer diameter of the output shaft 122, and is smaller than a hole diameter of the attaching hole 116B.

In accordance with the variant, the opening portion 116D leaving the attaching hole 116B open to the outer side is formed in the vehicle body side attaching stay 116, and the opening width of the opening portion 116D is made larger than the hole diameter of the output shaft 122. Accordingly, when the motor-driven steering assist apparatus 110 is assembled between the steering wheel side steering member 101 and the tire wheel side steering member 102, the output shaft 122 of the motor-driven steering assist apparatus 110 is moved in an axially perpendicular direction so as to pass the output shaft 122 from the opening portion 116D of the vehicle body side attaching stay 116 to the center portion of the attaching hole 116B. It is further moved in the axial direction so as to insert the annular attaching portion 113B of the third housing 113 to the attaching hole 116B of the vehicle body side attaching stay 116, thereby being assembled. Further, in accordance with an inverse procedure, where the motor-driven steering assist apparatus 110 is assembled between the steering wheel side steering member 101 and the tire wheel side steering member 102, the annular attaching portion 113B of the third housing 113 can be simply detached from the attaching hole 116B of the vehicle body side attaching stay 116. In this case, since the opening width of the opening portion 116D of the vehicle body side attaching stay 116 is made smaller than the hole diameter of the attaching hole 116B. The annular attaching portion 113B does not extend out of the opening portion 116D of the attaching hole 116B of the vehicle body side attaching stay 116, after the annular attaching portion 113B of the third housing 113 having approximately the same outer diameter as the hole diameter of the attaching hole 116B of the vehicle body side attaching stay 116 is inserted to the attaching hole 116B of the vehicle body side attaching stay 116 so as to be assembled.

As mentioned above, in accordance with the present invention, since the attaching seat and the annular attaching portion are provided in the lower surface of the housing, the attaching seat and the annular attaching portion are downsized without protruding to the outer side in comparison with the structure in which the attaching portion is provided in the outer periphery of the housing. The vehicle body side attaching stay is not enlarged in size, and it is possible to inhibit interference with the peripheral equipment such as the engine or the like.

Further, in accordance with the present invention, even if the outer shape of the housing is formed in the different shape, the attaching portion is not provided in the outer periphery of the housing, and the attaching seat and the annular attaching portion are provided in the lower surface of the housing. Accordingly, it is possible to simply form the attaching seat and the annular attaching portion.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. In the present invention, the gear train transmitting the rotation of the electric motor to the output shaft is not limited to the structure constituted by the worm gear and the worm wheel.

Further, in accordance with the present invention, a vibration absorbing elastic member may be interposed between the upper surface of the vehicle body side attaching stay and the attaching seat of the housing, and between the lower surface of the vehicle body side attaching stay and the nut.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven steering assist apparatus interposed between a steering wheel and a wheel side steering member for assisting steering force which a driver applies to the steering wheel on the basis of a generating torque of an electric motor, the motor-drive steering assist apparatus comprising:

a single unit body covered by a housing has an input shaft to which the steering wheel is connected, an output shaft to which the wheel side steering member is connected, a torque sensor provided between the input shaft and the output shaft, the electric motor driven in correspondence to a detected torque of the torque sensor, and a gear train which transmits a rotation of the electric motor to the output shaft built-in, an annular attaching portion surrounding the output shaft provided in a protruding manner in an attaching seat formed in the lower surface of the housing as seen from an axial direction of the output shaft, wherein the annular attaching portion of the housing is inserted in an attaching hole provided in a vehicle body side attaching stay, the attaching seat of the housing is seated on a peripheral portion of the attaching hole of the vehicle body side attaching stay, and the vehicle body side attaching stay is pinched between a nut screwed from a leading end side of the annular attaching portion of the housing and the attaching seat.

2. A motor-driven steering assist apparatus as claimed in claim 1, wherein an opening portion leaving the attaching hole open to the outer side is formed in the vehicle body side attaching stay, and an opening width of the opening portion is larger than an outer diameter of the output shaft, and smaller than a diameter of the attaching hole.

3. A motor-driven steering assist apparatus as claimed in claim 1, the housing comprising first to third housings, the first housing supports an upper end portion of the input shaft and the torque sensor, the second housing supports an upper end portion of the output shaft, the electric motor and the gear train, the third housing supports a lower end portion of the output shaft, and the attaching seat and the annular attaching portion are provided in a lower surface of the third housing.

4. A motor-driven steering assist apparatus as claimed in claim 3, wherein an opening portion leaving the attaching hole open to the outer side is formed in the vehicle body side attaching stay, and an opening width of the opening portion is larger than an outer diameter of the output shaft, and smaller than a diameter of the attaching hole.

5. A motor-driven steering assist apparatus as claimed in claim 3, wherein the locking portion of the vehicle body side attaching stay is formed by cutting up a part of the peripheral portion of the attaching hole, and the locked portion comprises a concave locked portion provided in a part along a peripheral direction of the annular attaching portion in the attaching seat of the third housing.

6. A motor-driven steering assist apparatus as claimed in claim 3, wherein the attaching seat and the annular attaching portion are received within a profile of the second housing as seen from an axial direction of the output shaft.

7. A motor-driven steering assist apparatus as claimed in claim 6, wherein an opening portion leaving the attaching hole open to the outer side is formed in the vehicle body side attaching stay, and an opening width of the opening portion is larger than an outer diameter of the output shaft, and smaller than a diameter of the attaching hole.

8. A motor-driven steering assist apparatus as claimed in claim 1, wherein in a state in which a locking portion is provided in the vehicle body side attaching stay, a locked portion is provided in the housing, the attaching seat of the housing is seated on the peripheral portion of the attaching hole of the vehicle body side attaching stay, and the locking portion and the locked portion are engagable so as to prevent the housing from rotating.

9. A motor-driven steering assist apparatus as claimed in claim 8, wherein an opening portion leaving the attaching hole open to the outer side is formed in the vehicle body side attaching stay, and an opening width of the opening portion is larger than an outer diameter of the output shaft, and smaller than a diameter of the attaching hole.

10. A motor-driven steering assist apparatus as claimed in claim 8, the housing comprising first to third housings, the first housing supports an upper end portion of the input shaft and the torque sensor, the second housing supports an upper end portion of the output shaft, the electric motor and the gear train, the third housing supports a lower end portion of the output shaft, and the attaching seat and the annular attaching portion are provided in a lower surface of the third housing.

11. A motor-driven steering assist apparatus as claimed in claim 10, wherein an opening portion leaving the attaching hole open to the outer side is formed in the vehicle body side attaching stay, and an opening width of the opening portion is larger than an outer diameter of the output shaft, and smaller than a diameter of the attaching hole.

12. A motor-driven steering assist apparatus as claimed in claim 10, wherein the locking portion of the vehicle body side attaching stay is formed by cutting up a part of the peripheral portion of the attaching hole, and the locked portion comprises a concave locked portion provided in a part along a peripheral direction of the annular attaching portion in the attaching seat of the third housing.

13. A motor-driven steering assist apparatus as claimed in claim 10, wherein the attaching seat and the annular attaching portion are received within a profile of the second housing as seen from an axial direction of the output shaft.

14. A motor-driven steering assist apparatus as claimed in claim 13, wherein an opening portion leaving the attaching hole open to the outer side is formed in the vehicle body side attaching stay, and an opening width of the opening portion is larger than an outer diameter of the output shaft, and smaller than a diameter of the attaching hole.

\* \* \* \* \*